F. SCHUBERT.
PRESSURE GAGE.
APPLICATION FILED APR. 10, 1908.

920,668.

Patented May 4, 1909.

WITNESSES
Frank A. Siibert.
Edgar M. Greenbaum

INVENTOR
Frederick Schubert,
BY E.F. Gennert
ATTORNEY

UNITED STATES PATENT OFFICE.

FREDERICK SCHUBERT, OF SELLERSVILLE, PENNSYLVANIA.

PRESSURE-GAGE.

No. 920,668.	Specification of Letters Patent.	Patented May 4, 1909.

Application filed April 10, 1908. Serial No. 426,249.

*To all whom it may concern:*

Be it known that I, FREDERICK SCHUBERT, a citizen of the United States, and resident of Sellersville, in the county of Bucks and State of Pennsylvania, have invented certain new and useful Improvements in Pressure-Gages, of which the following is a specification.

My invention relates to improvement in pressure gages, the object being to provide a means for returning the indicator to the zero mark when the Bourdon spring becomes set after use.

I will premise my invention by stating that when a gage has been in use for a number of years, the constant pressure has a tendency to increase the circle of the Bourdon spring, and when the gage is at rest or under no pressure, the indicator does not return to the zero mark because the said spring is "set". To overcome this defect, I use a spiral spring under tension when calibrating the gage, as will be fully described hereinafter.

Figure 1:
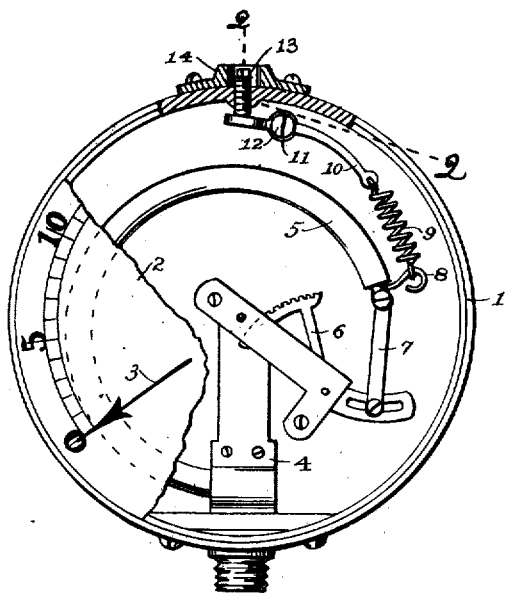
Figure 2:
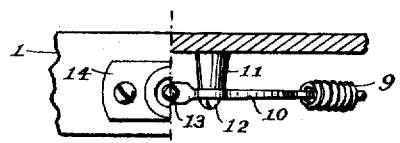

The accompanying drawings, which form part of this specification show, in Figure 1, a front elevation of my improved gage, the dial and indicator being broken away to show interior construction. Fig. 2 is a plan view on dotted line 2—2 of Fig. 1.

Similar reference-numbers indicate like parts in the two views.

My improvement consists in arranging a supplemental spring on the Bourdon spring, preferably at the top of the case, and by adjusting means regulate the tension of the combined springs so that the indicator can be set at zero at any time by the user without removing any parts for that purpose.

I show in Fig. 1 a gage having a case, 1, dial, 2, indicator, 3, post, 4, Bourdon spring, 5, sector, 6, and link, 7.

On the free end of the Bourdon spring I provide a hook, 8, to which one end of the supplemental spring, 9 is fastened, the upper end being passed through the eye of a lever, 10 which is fulcrumed on a stud, 11, and held in place by a screw, 12. The free end of the lever contacts with an adjusting screw, 13, threaded in the case, which screw has a square head extending outside of the case to permit adjustment by means of a clock key not shown—; this screw is protected by a suitable housing, 14, which is fastened to the case.

Such being the construction, the operation is as follows: When the gage is assembled, as described, a tension is put upon the supplemental spring so that the Bourdon spring will be carried upward and outward as though under pressure; in calibrating the scale, the spring 9 is taken into account, the said spring being under a tension as stated. When, after use, it is found that the Bourdon spring has become "set" so that the indicator does not return to zero when there is no pressure on the gage, the tension of the supplemental spring is relaxed by means of the adjusting screw, 13, until the indicator again points to zero, when the gage will again indicate the correct pressure. Another important feature in using this supplemental spring is that its use prevents the indicator from vibrating, when the gage is used on transportable boilers such as locomotives, steam rollers and so forth.

What I claim as new and desire to secure by Letters Patent is—

1. A pressure gage comprising a Bourdon spring carrying a hook at one end, a pivoted lever, a supplemental spring connecting the hook with one end of the lever and means engaging with the other end of the lever for adjusting it.

2. A pressure gage comprising a Bourdon spring, a pivoted lever, a supplemental spring connecting one end of the Bourdon spring with one end of the lever, and means engaging with the other end of the lever for adjusting it.

3. A pressure gage comprising a Bourdon spring, a curved pivoted lever, a supplemental spring connecting one end of the Bourdon spring to one end of the lever and means engaging with the other end of the lever for adjusting it.

4. A pressure gage comprising a casing, a Bourdon spring arranged therein, a curved lever pivoted intermediate its ends and positioned within said casing, a supplemental spring connecting one end of the Bourdon spring to one end of the lever, and means extending in the casing and engaging with the other end of the lever for adjusting it.

Signed at Sellersville in the county of Bucks and State of Pennsylvania this 6th day of April A. D. 1908.

FREDERICK SCHUBERT.

Witnesses:
NOBLE HARTZELL,
HENRY T. WILLIAMS.